United States Patent [19]

Wright

[11] Patent Number: 4,684,027

[45] Date of Patent: Aug. 4, 1987

[54] STATIONARY STORING AND DISPENSING SYSTEM

[75] Inventor: David M. Wright, Shrewsbury, Mass.

[73] Assignee: Wright Line, Inc., Worcester, Mass.

[21] Appl. No.: 912,069

[22] Filed: Sep. 25, 1986

[51] Int. Cl.⁴ .............................................. A47F 7/00
[52] U.S. Cl. ...................................... 211/40; 211/41; 312/15
[58] Field of Search ................ 211/42, 40, 41; 312/8, 312/9, 10, 15, 17; 206/387

[56] References Cited

U.S. PATENT DOCUMENTS 3,389,942  6/1968  Jacob ................................ 312/17 X
3,462,206  8/1969  Harnish et al. ...................... 312/17
4,317,603  3/1982  Pepicelli et al. ..................... 312/9
4,557,389  12/1985  Williams et al. .................. 211/40 X Primary Examiner—Robert W. Gibson, Jr.
Attorney, Agent, or Firm—Hamilton, Brook, Smith and Reynolds

[57] ABSTRACT

A storing and dispensing system for square or rectangular objects including a tray (T) having side by side cells 10. Each cell has a front wall (2), side walls (12), and a rear wall (4), a bottom (6), and an upwardly inclined ramps (28), extending rearwardly from the bottom surface to the rear wall. The side walls have extenders (14) joining them to the front wall.

12 Claims, 2 Drawing Figures

STATIONARY STORING AND DISPENSING SYSTEM

FIELD OF THE INVENTION

This invention relates to storing and dispensing systems in general and more specifically to a system for storing and dispensing square or rectangular objects such as magnetic tape cartridges, microfilm reels and the like.

BACKGROUND OF THE INVENTION

For years the accepted state-of-the-art means for supplying digital magnetic tape to data processors and other users was the familiar 10½-inch reel of ferric oxide magnetic tape. The development of the IBM 3480 Magnetic Tape Subsystem which utilizes a recording medium of chromium-dioxide magnetic particles on tape contained within compact, easy to handle cartridges, is rapidly making the 10½-inch tape reels obsolete. Not only is the chromium-dioxide magnetic tape technologically better than ferric oxide tape, but being stored in specially designed cartridges which are about 4 inches by 5 inches in size compared with the 10½-inch reels has resulted in substantial space saving to users.

In my copending application Ser. No. 739,976 filed May 31, 1985, I disclosed a "System for Storing and Dispensing Magnetic Tape Cartridges" of the type above described. The system is disclosed embodied in a library stack in the form of a frame comprising upright, horizontal members and supporting feet. Cartridges are stored side by side in cells in horizontal rows which are pivotal relative to horizontal support means which extend between the upright members of the frame.

Each cell has a front or cartridge-discharge end in a rear wall at the opposite end. Pivot means are located intermediately at the ends of the cell to permit the cell to pivot on the support. The center of gravity of the cell is located closer to the cartridge-discharge end than to the rear wall, whereby the cartridge-discharge end of the cell normally is inclined to pivot downwardly relative to the horizontal.

In its normal position, either with or without a cartridge contained in it, each cell occupies a substantially horizontal position. To remove a cartridge from the cell either a cell adjacent to it or cell on either side of it are pivoted manually against the resistance means to gain access to the desired cartridge.

It is an object of this invention to provide a cartridge storing and dispensing system with no moving parts.

It is another object of this invention to provide a cartridge storing and dispensing system which may be accommodated in library stacks of the type described in my above-identified application.

It is yet another object of this invention to provide a storing and dispensing system which may be accommodated in a drawer or on a flat surface such as a desk top or a desk rack, in cabinets or in movable trucks or dollies.

SUMMARY OF THE INVENTION

The invention resides in a stationary storing and dispensing system for square or rectangular objects such as cartridges and the like, which is in the general form of a tray having a front wall, a rear wall, and a bottom. Dividers project upwardly from the bottom of the tray to form a plurality of cells, each divider forming one side wall of a cell. The side walls are spaced from the front wall and terminate at the rear wall. A side wall extender extends forwardly from the side wall to the front wall. The extender is substantially lower than the side wall to expose a forward portion of an object such as a cartridge positioned in a cell on the bottom of the tray adjacent the front wall, whereby the object may readily be gripped for removal from the cell. The bottom of each cell extends from the front wall to a location which is spaced from the rear wall which is higher than the front wall. An upwardly inclined ramp joins the bottom to the rear wall so that an object which is manually displaced from a position on the bottom of the cell in a direction rearwardly and up the inclined ramp will slide back to the bottom when released. The tray includes means to position it on a supporting surface and its front wall has means for accepting identifying indicia. Depending upon the weight of the object, the included angle between the bottom and the upwardly inclined ramp is from about 130° to 155°.

DETAILED DESCRIPTION OF THE INVENTION

Figure 1:
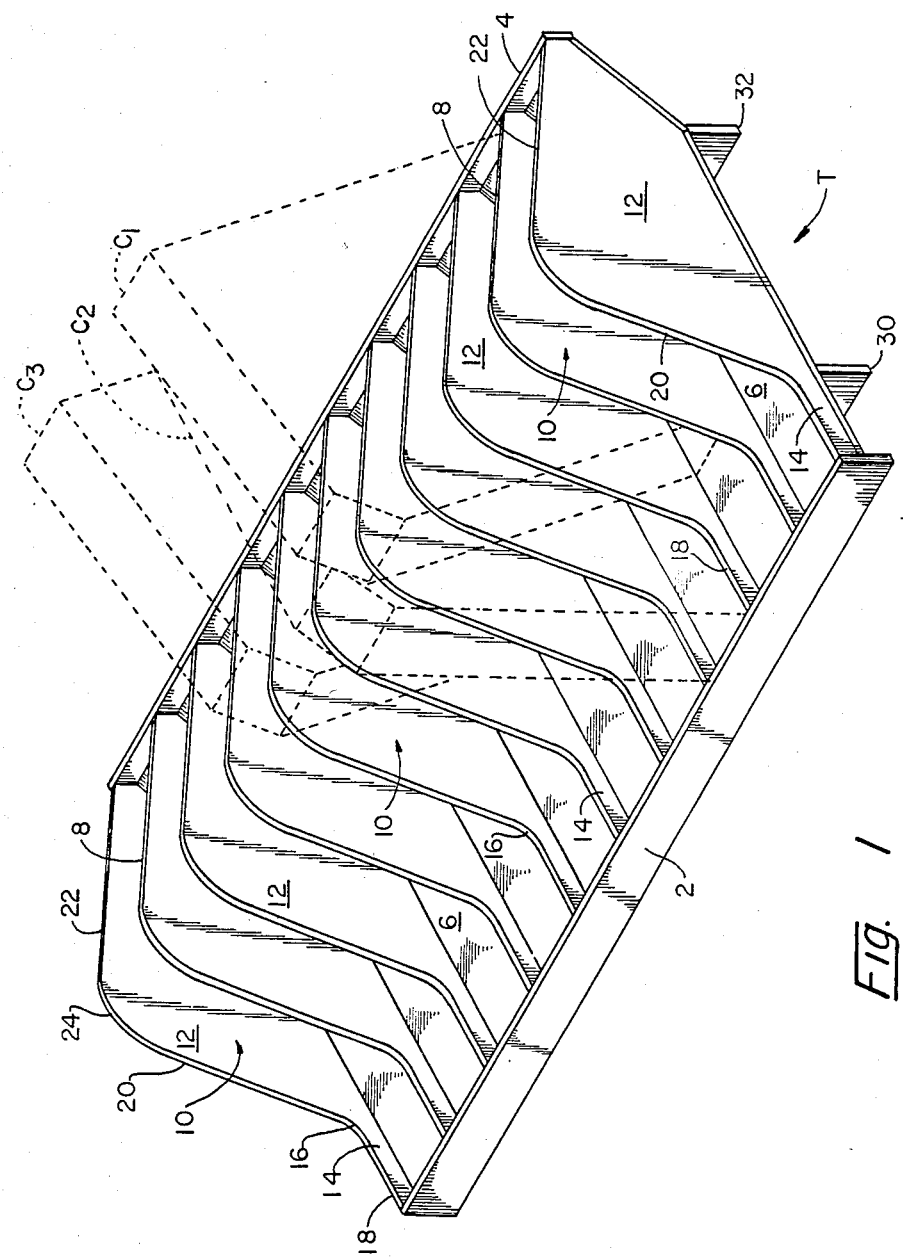
FIG. 1 is a perspective view of a stationary storing and dispensing system for objects embodying the present invention, with cartridges shown in dotted lines.

A stationary storing and dispensing system for objects such as cartridges and the like, will be seen in FIG. 1 and includes a tray T. It has a front wall 2 and rear wall 4 and a bottom 6. Dividers 8 project upwardly from the bottom 6 to form a plurality of cells 10. The dividers 8 form upstanding vertical side walls 12. Each cell shares at least one common side wall with an adjacent cell. A side wall extender 14 extends from the front wall 2 to a location 16 where it mergers with the side wall. The extender has a horizontal edge 18. The side walls have a first inclined edge 20 extending upwardly and rearwardly from the horizontal edge 8 at the location 16. An inclined edge 22 extends forwardly and upwardly from the rear wall 4. The inclined edges 20 and 22 are joined at a rounded apex 24 which is substantially above not only the bottom 6 of the tray but the front and rear walls 2 and 4 respectively.

Figure 2:
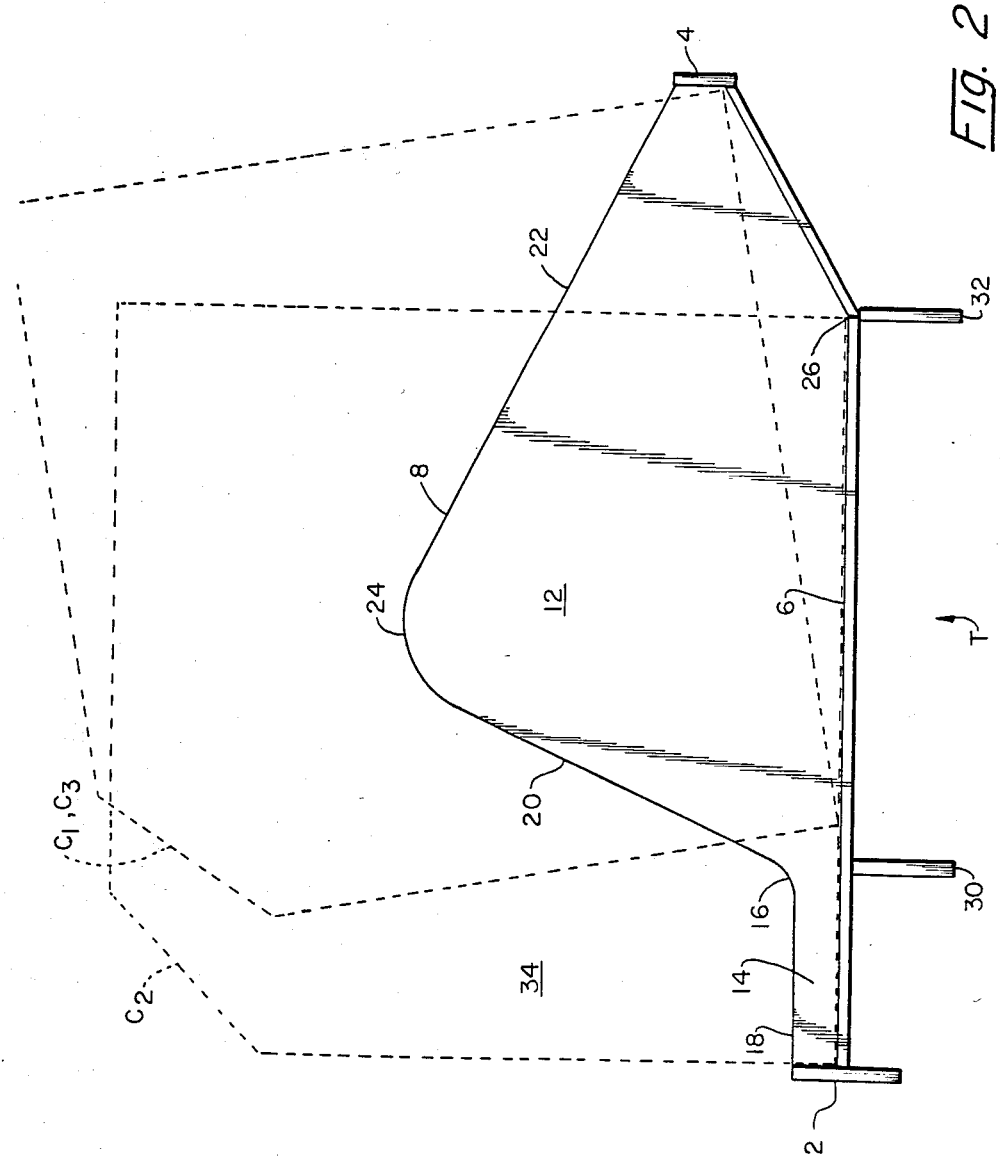
FIG. 2 is a side elevation of the storing and dispensing system.

As will be seen in FIG. 2 the bottom 6 of each cell extends from the front wall 2 to a location 26 which is spaced forwardly from the rear wall 4. An upwardly inclined ramp 28 extends from the bottom of each cell at the point 26 to the rear wall 4. The included angle between the bottom 6 and upwardly inclined ramp 28 is from about 130° to about 155° depending upon the weight of the cartridges to be stored in the cells.

The tray includes supporting rails 30 and 32 for positioning the tray on a supporting surface such as on a desk, in a drawer, or on the horizontal supporting means of my above-described library stack.

As will be seen in FIG. 2, the front wall 2 extends below the bottom 6 and serves to accept identifying indicia, such as decals, corresponding to similar indicia, on the cartridges stored in each cell.

Objects, herein illustrated as cartridges $C_1$, $C_2$, and $C_3$, are shown in phantom in the storing and dispensing system. Cartridge $C_2$ is positioned on the bottom 6 and extends from the front wall 2 to the inclined ramp 26. Because the horizontal edge 18 of the side wall extender 14 is substantially lower than the side walls 8 which extend upwardly to the apex 24, a forward portion 34 of cartridge $C_2$ is exposed whereby it may be readily gripped for removal from the cell when desired. However, the adjacent cartridges $C_1$ and $C_3$ normally occupy a position resting on the bottom 6 on either side of cartridge $C_2$.

To remove a desired cartridge, herein illustrated as cartridge $C_2$, the cartridges on either side of it, i.e., $C_1$ and $C_3$ are manually displaced, generally by the fingers of one hand, from their normal or "at home" positions on the bottom of the cell in a direction rearwardly and up the inclined ramp 28 permitting cartridge $C_2$ to be easily picked from the tray. When cartridges $C_1$ and $C_3$ are released, they slide back down the inclined ramp to the bottom of the tray returning to their "at home" positions.

To remove cartridges in the end-most cells of the tray, it is only necessary to displace the single cartridge in the cell next to it.

I claim:

1. A stationary storing and dispensing system for square or rectangular objects comprising:
    a tray having a front wall, a rear wall, and a bottom,
    dividers projecting upwardly from the bottom of the tray to form a plurality of cells, each divider forming one side wall of a cell,
    the side walls being spaced from the front wall and terminating at the rear wall to expose a forward portion of an object positioned on the bottom adjacent the front wall,
    the bottom extending from the front wall to a location spaced from the rear wall, the rear wall being higher than the front wall, and
    an upwardly inclined ramp joining the bottom to the rear wall,
    whereby an object manually displaced from a position on the bottom of the cell in a direction rearwardly and up the inclined ramp will slide back to the bottom when released.

2. A stationary storing and dispensing system for square or rectangular objects comprising:
    a tray having plurality of side-by-side cells,
    each cell having a front and rear wall, a bottom and a pair of upstanding vertical side walls,
    each cell sharing at least one common side wall with an adjacent cell,
    the side walls having:
        a horizontal edge extending from the front wall to a location spaced rearwardly from the front wall, a first inclined edge extending upwardly and rearwardly from the horizontal edge and a second inclined edge extending forwardly and upwardly from the rear wall and joining the first inclined edge at an apex above the bottom,
        an upwardly inclined ramp extending rearwardly from the bottom of each cell to the rear wall,
    whereby an object manually displaced from a position on the bottom of the cell in a direction rearwardly and up the inclined ramp will slide back to the bottom when released.

3. A stationary storing and dispensing system for square or rectangular objects comprising:
    a tray having plurality of side-by-side cells,
    each cell having a front and rear wall, a bottom and a pair of upstanding vertical side walls,
    each cell sharing at least one common side wall with an adjacent cell,
    an upwardly inclined ramp extending rearwardly from the bottom to the rear wall,
    whereby an object manually displaced from a position on the bottom of the cell in a direction rearwardly and up the inclined ramp will slide back to the bottom when released,
    each side wall extending from the rear wall toward the front wall and terminating at a location spaced from the front wall, a side wall extender joining the side wall to the front wall, the extender being substantially lower than the side wall to expose a forward portion of an object positioned on the bottom of the cell between the front wall and the inclined ramp,
    whereby the object may readily be gripped for removal from the cell.

4. A storing and dispensing system according to claim 1 having means to position it on a supporting surface.

5. A storing and dispensing system according to claim 2 having means to position it on a supporting surface.

6. A storing and dispensing system according to claim 3 having means to position it on a supporting surface.

7. A storing and dispensing system according to claim 1 having means on the front wall of each cell for accepting identifying indicia.

8. A storing and dispensing system according to claim 2 having means on the front wall of each cell for accepting identifying indicia.

9. A storing and dispensing system according to claim 3 having means on the front wall of each cell for accepting identifying indicia.

10. A storing and dispensing system according to claim 1 wherein the included angle between the bottom and the upwardly inclined ramp is from about 130° to about 155°.

11. A storing and dispensing system according to claim 2 wherein the included angle between the bottom and the upwardly inclined ramp is from about 130° to about 155°.

12. A storing and dispensing system according to claim 3 wherein the included angle between the bottom and the upwardly inclined ramp is from about 130° to about 155°.

* * * * *